(12) United States Patent
Huberman et al.

(10) Patent No.: US 7,002,915 B1
(45) Date of Patent: Feb. 21, 2006

(54) AUTOMATED MASS CALLING CONTROL FOR PUBLIC SWITCHED TELEPHONE NETWORKS EMPLOYING A PACKET BASED VIRTUAL TANDEM

(75) Inventors: Ronald M. Huberman, Nepean (CA); Ka K. Ho, Kanata (CA); Edwin M. Gans, Nepean (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/447,351

(22) Filed: Nov. 22, 1999

(51) Int. Cl.
*H04J 1/16* (2006.01)
*H04J 3/14* (2006.01)

(52) U.S. Cl. ............ 370/233; 370/235.1; 370/353; 370/461; 379/92.02; 379/112.03; 379/112.1

(58) Field of Classification Search ......... 370/229–235, 370/252–253, 400, 419, 420, 463, 522, 352–356, 370/493–495; 379/112.03, 112.04, 112.05, 379/112.06, 142.07; 455/26.1, 527, 445; 709/207, 103, 229, 239, 240; 710/44, 200, 710/244, 262, 264
See application file for complete search history.

(56) References Cited

U.S. PATENT DOCUMENTS

| | | | |
|---|---|---|---|
| 5,295,183 A | 3/1994 | Langlois et al. ............ 379/113 |
| 5,450,483 A | 9/1995 | Williams ................... 379/279 |
| 5,596,576 A * | 1/1997 | Milito ....................... 370/450 |
| 5,828,729 A | 10/1998 | Clermont et al. ............ 379/34 |
| 5,832,064 A * | 11/1998 | Jeong .................... 379/92.02 |
| 5,923,742 A * | 7/1999 | Kodialam et al. .......... 379/133 |
| 5,956,334 A * | 9/1999 | Chu et al. ................ 370/395.2 |
| 6,038,309 A * | 3/2000 | Ram et al. .................. 379/229 |
| 6,222,843 B1 * | 4/2001 | Mauger ..................... 370/397 |
| 6,243,449 B1 * | 6/2001 | Margulis et al. ....... 379/112.04 |
| 6,310,950 B1 * | 10/2001 | Spildener et al. .......... 379/219 |
| 6,351,521 B1 * | 2/2002 | DuRee et al. ............ 379/15.01 |
| 6,356,627 B1 * | 3/2002 | Hayball et al. ........ 379/112.01 |
| 6,389,011 B1 * | 5/2002 | Allen et al. ................ 370/356 |
| 6,424,700 B1 * | 7/2002 | Thibon et al. ........... 379/32.04 |
| 6,496,508 B1 * | 12/2002 | Breuckheimer et al. ..... 370/397 |
| 6,614,781 B1 * | 9/2003 | Elliott et al. ................ 370/352 |

* cited by examiner

*Primary Examiner*—Zarni Maung
*Assistant Examiner*—Van Kim T. Nguyen
(74) *Attorney, Agent, or Firm*—Marks & Clerk; S. Mark Budd

(57) ABSTRACT

This patent concerns a system and method for detecting a mass calling event in a telephone system and to regulate telephone calls to a call destination for which a mass calling event has been detected where a packet transport network and Call Server is integrated into the Public Switched Telephone Network (PSTN). A packet transport network and a central Call Server implement switching functionality traditionally provided by numerous Time Division Multiplexing (TDM) switches within the PSTN. A credit bucket mechanism is used for call regulation in a mass calling event. The packet network may be based on (but is not limited to) ATM, Frame Relay, or IP packet protocols.

15 Claims, 5 Drawing Sheets

AUTOMATED MASS CALLING CONTROL FOR PUBLIC SWITCHED TELEPHONE NETWORKS EMPLOYING A PACKET BASED VIRTUAL TANDEM

FIELD OF THE INVENTION

This invention relates to telecommunications networks and more particularly to voice and telephony over packet applications. Examples of underlying packet technologies may be (but are not limited to) ATM (Voice and Telephony over ATM-VToA), Frame Relay, or IP (Voice over IP-VoIP).

BACKGROUND

A packet based network along with a centralized Call Server has been proposed as a means of providing system functionality such as Toll-Tandem switching within a conventional Public Telephone Network. The packet network may be based on different Protocols such as ATM, Frame Relay or IP. The architecture, which will be described in greater detail later with relation to FIG. 1, consists basically of Interworking Functions (IWF), a Call Server, and a packet transport network. In this application these elements are configured to operate within the environment of an existing Public Switched Telephone Network (PSTN) consisting of Time Division Multiplexing (TDM) voice switches and a Signaling System #7 (SS7) network. Interworking Functions perform translation between conventional TDM signals and packets (e.g. ATM cells for VToA) at the interface between the TDM voice switches and the packet network. A centralized Call Server interacts with the SS7 signaling system translating Integrated Services Digital Network (ISDN) User Part (ISUP) messages concerning call setup into instructions to create connections (such as ATM Switched Virtual Circuits (SVCs)) between the Interworking Functions. For the end-to-end call setup, the Call Server generates the necessary SS7 signaling to the TDM voice switches normally provided by conventional Toll-Tandem switches. In its operation, the Call Server is also capable of performing many traditional Toll-Tandem functions such as number translation involving, for example 1-800 numbers.

It is possible that the existing TDM voice switches in such a system will be provided by a variety of vendors. Further, only a portion of these voice switches may fall under the administrative control of the network operator of the Voice over Packet (VoP) system.

A possible drawback of the above architecture, as in the conventional PSTN, is widespread network congestion under mass-calling situations. In this context a mass calling situation will exist when a particular number of geographic areas receive an excessive number of calls within a short time frame. While the dynamic nature of the routing architecture makes efficient use of transport resources and is highly adaptable, it makes application of conventional manual mass calling controls more difficult and if not addressed, mass calling has the potential to create network congestion at an accelerated rate.

There exists known prior art in the area of mass calling and congestion control for traditional TDM Voice Telephony. None of the prior art, of which applicants are aware, addresses the specific application area contemplated by the present invention, i.e. Mass Calling Control for Voice and Telephony over a Packet system wherein the network architecture employs a central Call Server.

U.S. Pat. 5,828,729 which issued Oct. 27, 1998 to Clermont et al, describes a method for detecting mass calling which operates by:

a) counting the number of call attempts towards a specific DN (Directory Number); and b) counting the number of call release messages arising from unsuccessful call attempts to a DN.

The method of the '729 patent relies on monitoring the incoming and outgoing signaling links of the TDM switches and monitoring the Signaling Transfer Points (STP). A central controller then consolidates these measurements on a network level basis. The present invention, however is concerned with the use of a centralized Call Server which can handle call setup operations in its administrative region. The Call Server receives SS7 ISUP messages for inter-office calls originating, terminating, and tandeming through its administrative region. The architecture described herein performs detection at this point eliminating the need to place monitoring equipment on the signaling links of TDM switches (these are the Link Interface Devices (LID) referred to in FIG. 3c. of the aforementioned U.S. Pat. No. 5,828,729). The Call Server described herein also acts as a central point to consolidate information for the administrative region. The approach described herein also performs detection when service tones are handled at the destination rather than the originating switch. The above referenced US Patent describes detection but does not include an automatic response to the Mass Calling Event.

U.S. Pat. No. 5,923,742, which issued Jul. 13, 1999 to Kodialam et al, describes a method for detecting mass calling which operates by using two register and counter pairs and configurable thresholds. The mechanism described generates a count of the number of occurrences of a dialed number. The present invention involves a mechanism for consolidating network level information on failed call attempts. U.S. Pat. No. 5,923,742 describes a detection process but only responds by generating an alarm.

U.S. Pat. No. 5,295,183 which issued Mar. 15, 1994 to Langlois et al, describes enhancements to an earlier patent (U.S. Pat. No. 4,284,852 to Szybicki et al) concerning dynamic call routing. The restrictive control policy of the '183 patent, provides for a procedure known as call gapping. The congestion control policy operates in an environment where switching offices are connected to a central processor. These switching offices provide updates of congestion information to the central processor. For the restrictive control policy, the central processor, during an update cycle, identifies "restricted" destinations. It also determines a recommendation for staggering calls to the restricted destinations, i.e. call gapping.

The Call Server described herein detects failed call attempts at the SS7 protocol level. Unlike the prior art it does not rely on the ability of switching offices to provide congestion information. This is necessary to ensure that the VoP solution can operate in a multi-vendor environment of existing TDM voice switches. The Call Server participates in the call setup operations within its administrative region. As a result, it can carry out staggering or gapping operations itself without relying on the TDM voice switches. This may be necessary for traffic from a foreign network whose destination is a local subscriber undergoing mass calling in an environment where foreign network falls under a different administrative authority than the operator (e.g. possibly a competing carrier).

For regulation at the Call Server, a mechanism known herein as a credit bucket call approach, which will be described later, is simpler to implement than gapping as described in U.S. Pat. No. 5,295,183. Gapping requires a fetch of a timestamp on the arrival of a new call. The operation of the present invention achieves the same effect as gapping without the need to fetch a timestamp on the arrival of a new Initial Address Message (IAM). Instead only a periodic timer and a count are required. This bucket resembles a packet policer although the application domain is different.

U.S. Pat. No. 5,832,064, which issued Nov. 3, 1998 to Jeong, discloses a mass calling processing method for a televoting service. The '064 patent relies on an intelligent type service provider to offer a mass calling process in response to a known event of an influx of calls to a specific directory number. The method proposed in the present invention is intended for general telephony over a packet network.

U.S. Pat. No. 5,450,483, which issued Sep. 12, 1995 to Williams, is similar to the aforementioned U.S. Pat. No. 5,828,729 in that it also relies on counting failed calls to a called number. When the count exceeds a threshold, the counter is said to be in an overloaded state and call restriction is applied. After entering an overload state, if the counter falls below a second threshold then the counter goes into a no-overload state. The U.S. Pat. No. 5,450,483 patent uses a node level load detection and restriction in contrast to the centralized detection and restriction method described herein. The invention described herein includes a more resource efficient call restriction technique and operates in an environment of existing TDM voice switches from different vendors and does not require the existing voice switches to be modified in any manner. Detection based solely on a configured threshold of failed call attempts does not take into consideration that different destinations may have different numbers of voice lines. Since the destination may be outside the administrative region under control, the exact number of lines at the destination is unknown. The method described herein uses an approximation to the percent of call attempts failed as a mechanism for the Call Server to invoke regulation.

There also exist related techniques which cover some aspects of this problem. Specifically, code gapping is one technique used at Signaling Control Points (SCPs). In this approach excessive requests for translation services (e.g. 800 numbers) on a dialed number causes invocation of call regulation. Code gapping handles only mass calling to numbers related to translation services. The approach described herein handles both conventional numbers and numbers requiring translation services. This is a significant issue since a call to a Directory Number (DN) can arise not only from dialing an 800 number which translates into the DN but also from dialing the DN itself without invoking translation services (see U.S. Pat. No. 5,828,729 to Clermont et al.).

There exists known prior art in the area of Voice and Telephony over ATM. U.S. Pat. No. 5,568,475 which issued Oct. 22, 1996 to Doshi et. al, describes an ATM network architecture that interfaces with Synchronous Transfer Mode (STM) switches. Out of band signaling is used in this architecture to transfer telephone call signaling information. U.S. Pat. No. 5,568,475 does not specifically address the problem of Mass Calling Detection and Call Regulation. U.S. Pat. No. 5,956,334 which issued Sept. 21, 1999 to Chu et. al, presents an architecture for interfacing an ATM network to a telephony network. U.S. Pat. No. 5,956,334 also does not specifically address the problem of Mass Calling Detection and Call Regulation.

SUMMARY OF THE INVENTION

The present invention provides a system and method of controlling a mass call event in a PSTN environment in which a packet network and call server are employed as a means of transporting voice telephone calls between traditional TDM switches. The packet transport network may be based on (but not limited to) packet protocols such as ATM, Frame Relay, or IP.

In a specific aspect of the invention a Call Server is associated with the packet network to control and facilitate call setup operations across the packet network and to interact with the TDM switches.

The present invention also provides a credit mechanism for use in efficiently controlling mass calling events.

Therefore in accordance with a first aspect of the present invention there is provided a call server for use in association with a packet network. The packet network transports voice telephone calls between end systems in a public switched telephone network (PSTN), the packet network having interworking functionality to bi-directionally convert TDM signals and packets (e.g. ATM cells), the call server having means to centrally control functionality within the packet network and time division multiplexed (TDM) switches within the PSTN.

In accordance with a second aspect of the invention there is provided a credit bucket method for use in controlling telephony calls to a telephone directory number in a detected mass calling event comprising: periodically assigning credit tokens to the credit bucket, and blocking a call to a dialed number if there are no current credit tokens assigned to a bucket associated with the number.

According to a further aspect there is provided a system for use in controlling telephone calls to a call destination in a mass calling event comprising: means to detect a mass calling event to the call destination; means to assign credit tokens to a credit bucket associated with a dialed number associated with the destination on a timed basis; and means to determine whether the credit bucket has any current tokens.

In another aspect there is provided a system for controlling telephone calls through the public switched telephone network (PSTN) having a packet transport network (e.g. ATM network) comprising: a plurality of interworking elements to provide interworking functionality between TDM switches in the PSTN and connections in the packet network (such as switched virtual circuits (SVCs) in an ATM network); and a call server to provide control, tracking and recording functionality respecting telephone calls through the system.

BRIEF DESCRIPTION OF THE DRAWINGS

The invention will now be described in greater detail with reference to the attached drawings wherein.

DETAILED DESCRIPTION OF THE INVENTION

To assist in the understanding of the detailed description the following is a list of acronyms used herein.

ACM Address Complete Message
ANM Answer Message
DPC Destination Point Code
IAM Initial Address Message
ISUP ISDN User Part
OPC Originating Point Code
REL Release Message
SS7 Signaling System 7
SCP Signaling Control Point
SSP Signal Switching Point
STP Signal Transfer Point
TCAP Transaction Capabilities Application Part
VoIP Voice over IP
VToA Voice and Telephony over ATM The Prior Art discussed above relates to telephone systems and mass calling events in such systems involving the conventional Public Switched Telephone Network. TDM switches within the PSTN support certain functions including call setup. The present invention incorporates a packet transport network (e.g. ATM network) into the PSTN environment. Call setup across the packet network is controlled by a central control unit known herein as a Call Server. The Call Server also interacts with the PSTN through an out-of-band signaling system.

Figure 1:
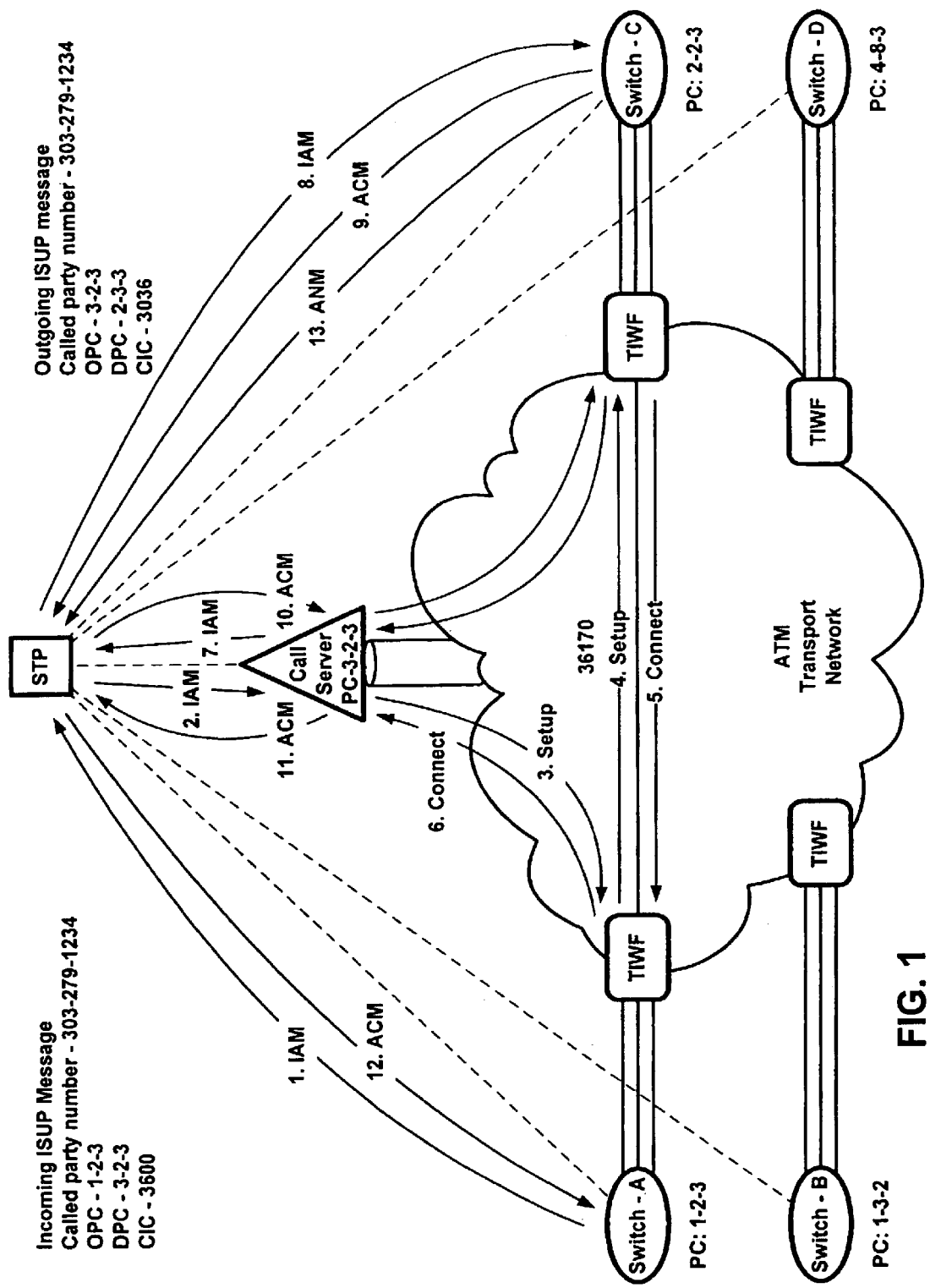
FIG. 1 is an architectural diagram of the VoP (Voice over Packet) system according to the present invention.

As shown in FIG. 1 the generic system architecture of the present invention consists of a collection of conventional TDM voice switch offices 22, an SS7 network including Signal Transfer Point (STP) 24, Interworking Functions (IWFs) 26, a Call Server 28, and a packet transport network 30. The numbered lines 1 to 13 identify a signaling sequence for setting up a call between Switch A and Switch C with the arrows indicating the signaling direction. An Initial Address Message (IAM) from Switch A to the STP 24 is passed through to the Call Server 28 which signals the IWFs 26 associated with Switch A and Switch C. A connection is setup through the packet transport network 30 to the IWF associated with Switch C. A return message is provided to the IWF associated with Switch A which in turn sends a connection message back to the Call Server. The Call Server sends an IAM to Switch C via the STP 24 and Switch C returns an Answer Complete Message (ACM) to the STP. The ACM is forwarded to the Call Server and then to Switch A via the STP. When the destination goes off-hook, an Answer Message (ANM) is returned by Switch C to the STP 24. A specific application (such as VToA) would use the messages appropriate to the underlying packet technology (e.g. ATM) to establish the connection between the IWFs (e.g. SVC call setup messages for VToA).

Interworking Functions (IWFs) bi-directionally convert TDM signals and packets at the interface between the TDM voice switches and the packet network. As an example, the IWFs would perform Circuit Emulation for a VToA scenario. The Call Server 28 interacts with the SS7 signaling network translating ISUP messages concerning call setup into call setup operations between the Interworking Functions (IWF). For VToA, these setup messages would be SVC call setups. The Call Server generates the necessary SS7 signaling to the existing TDM voice switches normally provided by conventional Toll-Tandem switches. In its operation, the Call Server is capable of performing many traditional Toll-Tandem functions such as dialed number translation.

In a conventional PSTN the TDM voice switches may be systems from a variety of vendors. Only a portion of these voice switches fall under the same administrative control as the network operator of the VoP system.

In a Mass Calling Event a large number of call originators attempt to reach the same call terminator or set of terminators. This behavior is triggered by an unusual external event. (e.g. calls directed towards an airline during a severe storm).

The architecture described herein is required to perform numerous operations in setting up a call to the terminator(s) of the mass calling event. These setup operations consume: call processing capacity of packet nodes and TDM Switch Offices; packet network link capacity; processing capacity of the Call Server; and SS7 bandwidth. The consumption of such resources is ultimately futile since the destination is probably busy.

The following are important aspects of this operation:

1. Mass Calling may be directed towards either conventional numbers or numbers related to translation services (e.g. 800 or 900 numbers). For number-translation related services dialed numbers can be translated to a network routable number (which is commonly referred to as a Directory Number (DN)).

2. Multiple dialed numbers (e.g. 800) may translate into a single DN.

3. A single dialed number (e.g. 800) may translate into multiple DNs.

4. The translation related service may be handled outside of the Administrative region by a Foreign Network.

5. When mass calling involves a translation related service which requires a TCAP query to an SCP, call regulation on un-translated numbers reduces the load on the SCP. To support this feature, it is necessary to reverse map DNs back to un-translated numbers for call control if dialed number translation is involved.

To address the above aspects the system architecture should:

(1) Detect a Mass Calling Event;
(2) Regulate the Call Rate to the Destination(s) Experiencing Mass Calling;
(3) Detect the End of the Mass Calling Event; and
(4) Cease Call Regulation when the Mass Calling Event ends.

It is also a requirement that the proposed system operate in a real-time environment.

Because call setups involve the centralized Call Server, the Call Server is in a position to be able to automatically perform the above operations without the need for additional monitoring equipment at the signaling links of the originating and terminating offices as well as at the STP as required in the aforementioned U.S. Pat. No. 5,828,729.

Unlike the central processor described in U.S. Pat. No. 5,295,183, the Call Server of the present invention does not know the number of lines at the restricted destination. Using a fixed target of failed call attempts as a control point for a regulation procedure would treat a destination with 5 lines the same as a destination with 100 lines. Clearly a higher number of failed call attempts would be acceptable for the destination with more lines.

The control point for initiating the regulation procedure of the present system is set in accordance with the ratio of detected, failed call attempts to the number of IAM messages. This is an approximation to the % of call attempts failed due to called party busy. (i.e. call blocking at the subscriber line)

In a Mass Calling Event, there will be an abnormally high number of calls to a destination which are not completed. There are three possible scenarios that can arise. When service tones (e.g. busy) are sent by the originating switch, call failures due to saturation can be detected in the form of a large number of call attempts which fail having a Release Message with a cause code indicating that the called party line is busy. When service tones are sent by the destination exchange rather than handled locally, the absence of an ANM (Answer Message) indicates that the call has not been successfully completed. Under severe mass calling, there may not be sufficient network resources to even reach the destination switch. From the perspective of mass call detection, a large number of failed calls due to lack of network resources would also be a symptom of mass calling.

The following is a description of the Mass Calling Detection procedure for the Call Server when the originating exchange handles service tones:

When the Call Server receives an Initial Address Message (IAM) from the PSTN (referred to as the incoming IAM) and the corresponding call attempt is not blocked by Call Regulation, the Call Server performs dialed number translation (if appropriate); identifies the outgoing Trunk Group to which the call is to be routed; selects a Circuit Identification Code (CIC) on the outgoing Trunk Group; initiates call setup required to establish a connection across the packet network between the IWFs handling the two TDM circuit endpoints of the call (based on the CIC in the incoming IAM message and the CIC selected by the call server) (e.g. an ATM SVC setup for VToA); and transmits a new IAM message (referred to as the outgoing IAM) addressed to the DPC associated with the selected Trunk Group. This IAM contains the selected CIC. Call Regulation will be described later.

To track calls to a destination, the Call Server needs a number associated with the destination. For the scope of this invention, this number will be referred to as the Reference Number (RN). This can be the dialed number or it can be a routable Directory Number (DN) obtained through translation services on the dialed number (e.g. 800 numbers). It should be noted that translation services may be handled by a foreign network In this case the RN is the untranslated dialed number.

The Call Server maintains a cache in temporary storage which is organized into a list of cache entries. During processing of an incoming IAM and generation of the outgoing IAM, the Call Server creates a cache entry containing the RN determined from the incoming IAM (a dialed number or a DN from translation service), the un-translated dialed number (which may be the same as the RN), the DPC of the outgoing IAM, and the CIC of the outgoing IAM. This differs slightly from the aforementioned '729 patent where it is necessary to cache the detected IAM's DPC and CIC. The DPC and CIC of the outgoing IAM are stored to be matched against the OPC and CIC of a REL with a cause indicator for called party busy.

Associated with updating this cache is maintaining a count of IAMs associated with an RN which is flagged for restriction monitoring. This procedure will be described later.

If a Release Message is received which has a cause indicator that the called party line is busy, a search is done on the entries in the cache. This search attempts to find a cache entry where the cached DPC of the outgoing IAM matches the OPC of the REL message and the cached CIC of outgoing IAM matches CIC of the REL. On a match it is necessary to update a count of failed call attempts against the RN. The search is conducted in a manner which finds the most recently created matching cache entry.

The receipt of a REL messages with any cause code allows the recycling of the matching cache entry. Other events may trigger cache entry recycling. Elements which are eligible for recycling are not used for searches arising from subsequent RELs.. The exact details of cache maintenance are left as an implementation issue.

Figure 2:
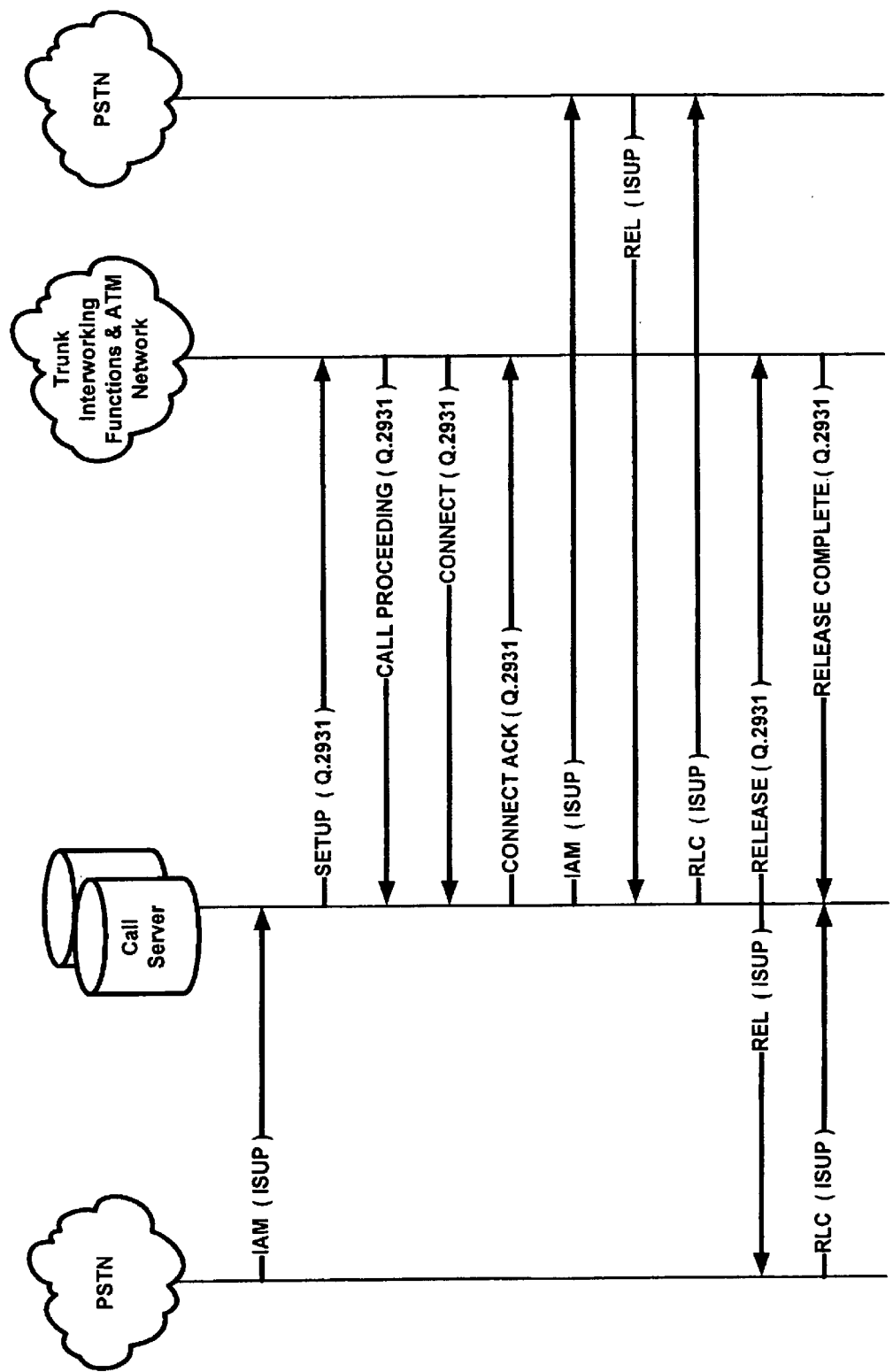
FIG. 2 is an example message sequence chart for a failed call through the system with local handling of service tones in a VToA (Voice and Telephony over ATM) scenario.

As an example, a possible message sequence for a failed call with local handling of service tone in a VToA Toll tandem replacement scenario is depicted in FIG. 2.

The following describes how the Call Server maintains a count of a failed call attempt against an RN. The Call Server maintains a tracking table in memory. The tracking table contains a list of entries. Each entry contains the following information:

an RN,
one or more un-translated dialed numbers, List
a count of detected failed call attempts, $C_{FAIL}$
a count of the number of IAMs associated with the RN of the entry, $C_{IAM}$
a flag indicating restriction monitoring is active, $R_{MON}$
a flag indicating that call regulation is active, $R_{REG}$ For each instance of a detected failed call attempt, the tracking table is maintained by searching for an existing entry containing the RN associated with the detected failed call attempt. Each instance of a detected failed call results from a match against a cache entry which contains the RN. The un-translated dialed number in the same cache entry, referred to as the dialed number associated with the failure instance for RN, is required for the update operation. If no existing table entry for RN is found:

a new table entry is created for the RN associated with the detected failed call attempt,
the un-translated dialed number associated with the failure instance for RN is inserted into List in the newly created entry
for the new table entry $C_{FAIL}$ is set to 1, $C_{IAM}$ is set to 0, $R_{MON}$ is set to false, $R_{REG}$ is set to false If an existing table entry is found:
$C_{FAIL}$ of the located table entry is incremented by 1
if the un-translated dialed number associated with the failure instance for RN is not contained in List in the existing table entry, the un-translated number is added to List Whenever the Call Server receives a new incoming IAM and the corresponding call has not been blocked by Call Regulation and a corresponding RN is determined, the tracking table is examined for an entry with a matching RN. If a table entry is found AND the entry is flagged for restriction monitoring ($R_{MON}$=true), then $C_{IAM}$ of the tracking table entry is incremented.

After a configurable interval of time $T_U$, a process within the Call Server examines the tracking table. The process performs the following for each tracking table entry:

1. If ( $R_{MON}$=true) the process calculates the current approximate measured call blocking $BM_O$ where $$BM_0 \leftarrow \frac{C_{FAIL}}{C_{IAM}}$$

If $R_{REG}$=false then $BM_O$ is then compared against a configurable threshold $B_T$.

If( $BM_O \geq B_T$) and ($R_{REG}$=false) then the process sets $R_{REG}$ to true.

When the process sets $R_{REG}$ to true, it passes $BM_O$, the associated RN and List in the tracking table entry to the Call Regulation procedure to establish a credit bucket and initialize counts related to the RN. These aspects of Call Regulation will be described later.

2. If ($R_{MON}$=false) the process tests $C_{FAIL}$ against a configurable threshold $M_{FAIL}$. If the count exceeds the configured threshold, restriction monitoring is started for the RN. $R_{MON}$ is set to true. It should be noted that this step follows step 1 since an accurate count of $C_{IAM}$ has not yet been maintained.

3. If ($R_{REG}$=true) then the process passes $BM_O$ to Call Regulation. Call Regulation (described later) has the ability to halt regulation on a RN. If Call Regulation indicates that regulation should be ended on the RN, then $R_{REG}$ is set to false.

4. Finally, a mechanism is required to end restriction monitoring and free the entry from the table. If (($R_{MON}$=true) and ($R_{REG}$=false) and ($C_{FAIL}$<$M_{FAIL}$)) then $R_{MON}$ is set to false.

After the process has performed the above operations on the table entry, if the entry has ($R_{MON}$=true) then the counts $C_{FAIL}$ and $C_{IAM}$ are reset to 0 for the next interval; otherwise (i.e. $R_{MON}$=false) the entry is removed from the table.

It is worth noting that this procedure has another advantage over the '729 patent. It is not necessary to intercept TCAP responses for translated numbers—the Call Server has responsibility for this operation.

When service tones are sent by the destination, the detection mechanism based on REL with cause indicator of line busy is not applicable. In this scenario, a one directional connection exists from the destination exchange to the originating exchange. The destination exchange uses this one way connection to send back service tones. As a result, the originating exchange does not receive a REL with cause indicator of line busy when the called party is busy.

Figure 3:
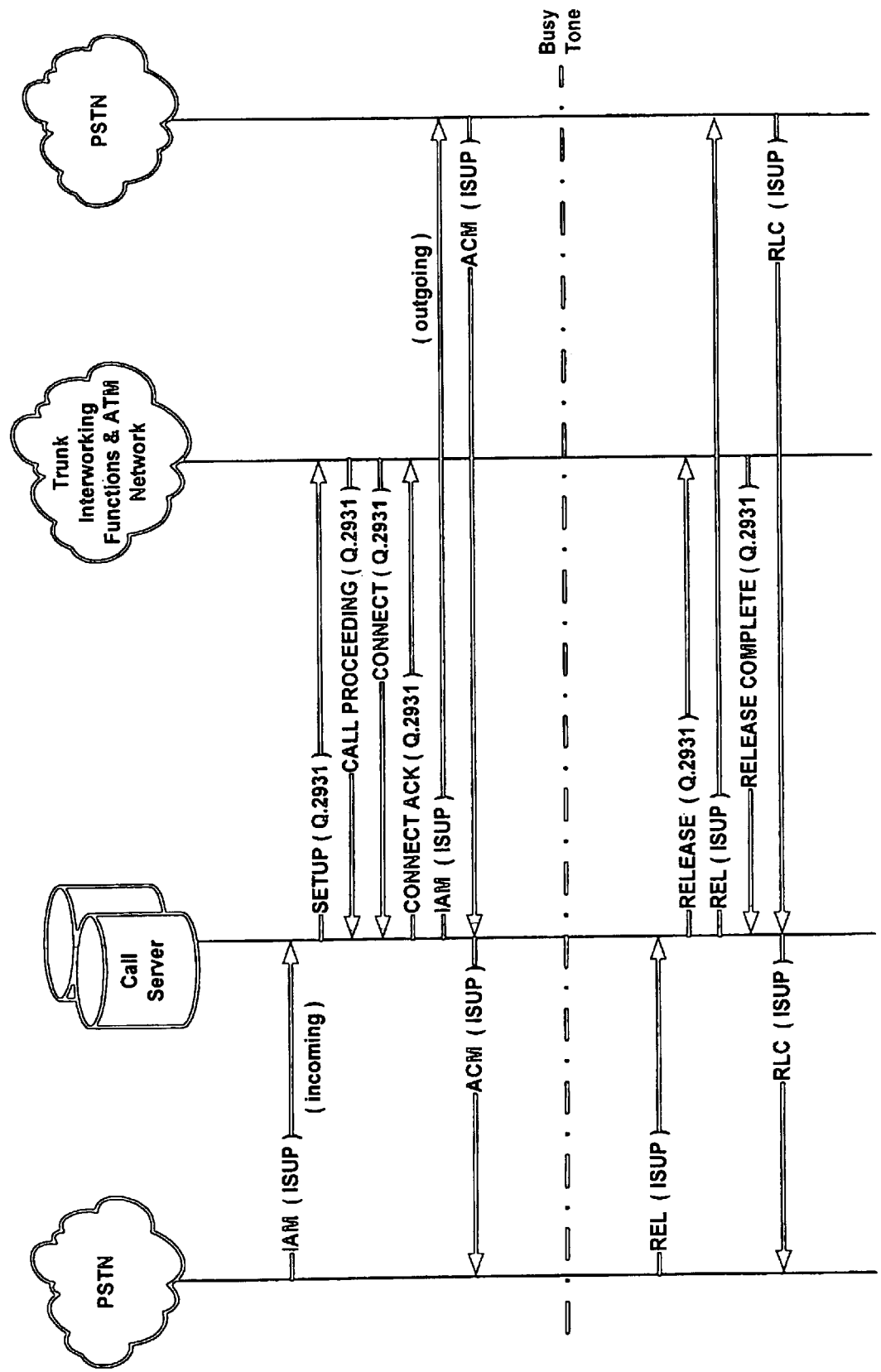
FIG. 3 is an example message sequence chart for a failed call through the system with the destination handling service tones in a VToA scenario.

A message sequence chart for an example of this scenario in a VToA architecture is depicted in FIG. 3. From an SS7 protocol perspective, this message sequence is different from a successful call since no ANM (Answer Message) is sent from the destination i.e. the called party does not answer the call. This situation can be detected by a procedure that will be described below. It should be noted that detection based on the absence of an ANM will also count call attempts which end due to reasons other than called party busy. For example, if the originator elects to stop waiting for the called party to answer the SS7 message sequence would be identical to the case when the destination handles service tones. The effect of these false readings can be mitigated by ensuring that the detection threshold for failed calls is set high enough that these false readings do not trigger restriction monitoring.

It should also be noted that FIG. 3 shows the call attempt being tom down in response to the originator terminating the call on receipt of the service tone (busy). It is understood that a time-limit may exist on the presentation of this tone and the call attempt may be torn down in response to the expiration of this time-limit. However, this is considered to be a rare enough event to not impact the mass calling detection mechanism.

The following is a description of the Mass Calling Detection procedure for the Call Server when the destination exchange handles service tones. When the Call Server receives an Initial Address Message (IAM) (referred to as the incoming IAM) from the PSTN and the corresponding call attempt is not blocked by Call Regulation, the Call Server:

performs dialed number translation (if appropriate)

identifies the outgoing Trunk Group to which the call is to be routed selects a CIC on the outgoing Trunk Group initiates call setup required to establish a connection across the packet network between the IWFs handling the two TDM circuit endpoints of the call (based on the CIC in the incoming IAM message and the CIC selected by the call server) (e.g. ATM SVC call setup for VToA)

transmits a new IAM message addressed to the DPC associated with the selected Trunk Group. This IAM contains the selected CIC. This new IAM is referred to as the outgoing IAM.

To support this form of detection, the Call Server requires a cache which is organized into a list of cache entries. Each cache entry stores:

the RN determined from the incoming LAM (a dialed number or a DN from translation service), the un-translated dialed number the OPC and CIC of the incoming IAM the DPC and CIC of the outgoing IAM.

a flag $R_{ANM}$ indicating that an ANM message has been received

This cache may be implemented as an extension to the cache used for detection when service tones are locally handled. When a new cache entry is first created $R_{ANM}$ is set to false.

If an ANM arrives at the Call Server, a search is performed on the cache to find a cache entry where:

the stored outgoing IAM CIC matches the CIC in the ANM, the stored outgoing IAM DPC matches the OPC in the ANM.

If such a cache entry is found the flag $R_{ANM}$ is marked true.

The search is conducted in a manner which finds the most recently created matching cache entry.

If a REL arrives at the Call Server, a check is made against the cache for an entry where:

the stored incoming IAM CIC matches the CIC in the REL the stored incoming IAM OPC matches the OPC in the REL If there is a match to a cache entry and the flag $R_{ANM}$=false in the cache entry then this is treated as a failed call attempt against the RN stored in the cache entry. This failed call attempt is tracked in the manner described above. The search is conducted in a manner which finds the most recently created matching cache entry.

The receipt of a REL messages with any cause code allows the recycling of the matching cache entry. Other circumstances may trigger cache entry recycling. For example, if this cache is implemented as an extension to the cache used for detection when service tones are locally handled then the recycling may be triggered by a different form of matching between a REL and a cache entry (see section on local handling of service tones). Elements which are eligible for recycling are not used for searches arising from subsequent RELs. The exact details of cache maintenance are considered to be an implementation issue.

Under mass calling conditions, there may be insufficient network resources to reach the destination voice switch. When the Call Server identifies that there are no network resources to handle a call, the Call Server can respond by sending a REL with a cause code indicating that network resources are unavailable. These events can be detected by the following procedure:

When the Call Server receives an Initial Address Message (IAM) from the PSTN (referred to as the incoming IAM) and the corresponding call attempt is not blocked by Call Regulation, the Call Server performs dialed number translation (if appropriate) and attempts to handle the call. However, if there are no network resources to route the call the Call Server may issue a REL with a cause code indicating that resources are unavailable or use an Intelligent Peripheral (or other means) to present a service tone.

To support detection based on network resource unavailable, the Call Server maintains a cache in temporary storage which is organized into a list of cache entries. Each cache entry stores the RN determined from the incoming IAM (a dialed number or a DN from translation service), the un-translated dialed number (which may be the same as the RN), the OPC of the incoming IAM, and the CIC of the incoming IAM. A cache implemented to support mass calling detection on the absence of an ANM (previously described) can be used. In this case, some of the fields in the cache entries will be left unused.

When the Call Server issues a REL with a cause code which indicates that network resources are unavailable, a search is performed on the cache to find a cache entry where the DPC of the REL matches the stored OPC of the incoming IAM and the CIC of the REL matches the stored CIC of the incoming IAM. If there is a match to a cache entry then this is treated as a failed call attempt against the RN stored in the cache entry. This failed call attempt is tracked in the manner described above. The search is conducted in a manner which finds the most recently created matching cache entry.

A match against a cache entry with an issued REL causes the recycling of the cache entry. Other circumstances may trigger cache entry recycling. Elements which are eligible for recycling are not used for searches arising from subsequent RELs. The exact details of cache maintenance are considered to be an implementation issue.

As an alternative to generating a REL, the Call Server may us an Intelligent Peripheral (or other means) to present service tone. This alternative is covered under the detection based on the absence of ANM.

This form of detection may produce false readings for destinations which share common routing with the actual destination(s) experiencing mass calling. The effect of these false readings can be mitigated by ensuring that the detection threshold for failed calls is set high enough that these false readings do not trigger restriction monitoring.

As discussed in the aforementioned prior art, Call Gapping is a traditional call regulation method. Before a call destined for a restricted dialed number is initiated, the originating voice switch tests whether time T has passed since the last call with the same destination was initiated. This essentially can be thought of restricting the call rate to be less than 1/T. The actual rate may be less than this limit.

The Call Server of the present invention can perform Call Regulation to achieve a similar result to gapping using data available to the Call Server. In this implementation a bucket of "call credits" is created within the Call Server which is associated with the one or more dialed numbers associated with an RN undergoing the control action. The bucket is initially filled with 0 credits. After the system-determined interval $T_{arrival}$, one credit is added to the "call credit" bucket. When an IAM message arrives at the Call Server with a dialed number associated with a bucket, the Call Server checks the associated credit bucket. If the bucket is empty (zero), the call setup is immediately blocked. If the bucket contains non-zero credits, the bucket is decremented and the call is serviced by the Call Server.

Figure 4:
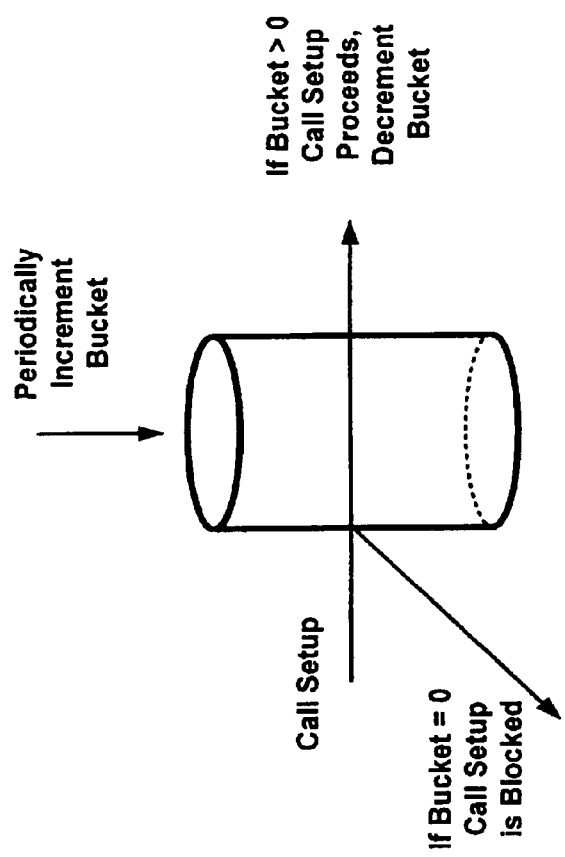
FIG. 4 is a pictorial representation of the credit bucket mechanism according to one aspect of the invention.

FIG. 4 depicts the credit bucket mechanism. As shown a credit token is periodically added to the bucket with a period $T_{arrival}$ that will be discussed later. At call set up the bucket is checked and if no credits exist the call is blocked by the Call Server. If the bucket holds at least one credit the call is set up and the bucket credit is decremented by one.

To prevent counter overflow, a maximum ceiling L is applied to the credit bucket –if the number of credits is>L then the periodic increment is ignored. L may be a configurable parameter.

Unlike call gapping, this mechanism does not require a fetch of a timestamp when a call arrives—only a periodic update of the bucket is required. This can be a significant issue under mass calling conditions when a large number of call attempts will be blocked.

When Call Regulation is first invoked by the Call Detection process for a RN $R_{REG}$ to true), Call Regulation establishes a bucket associated with the un-translated numbers in List passed to it by the Detection process. The $T_{arrival}$ used is described below.

Figure 5:
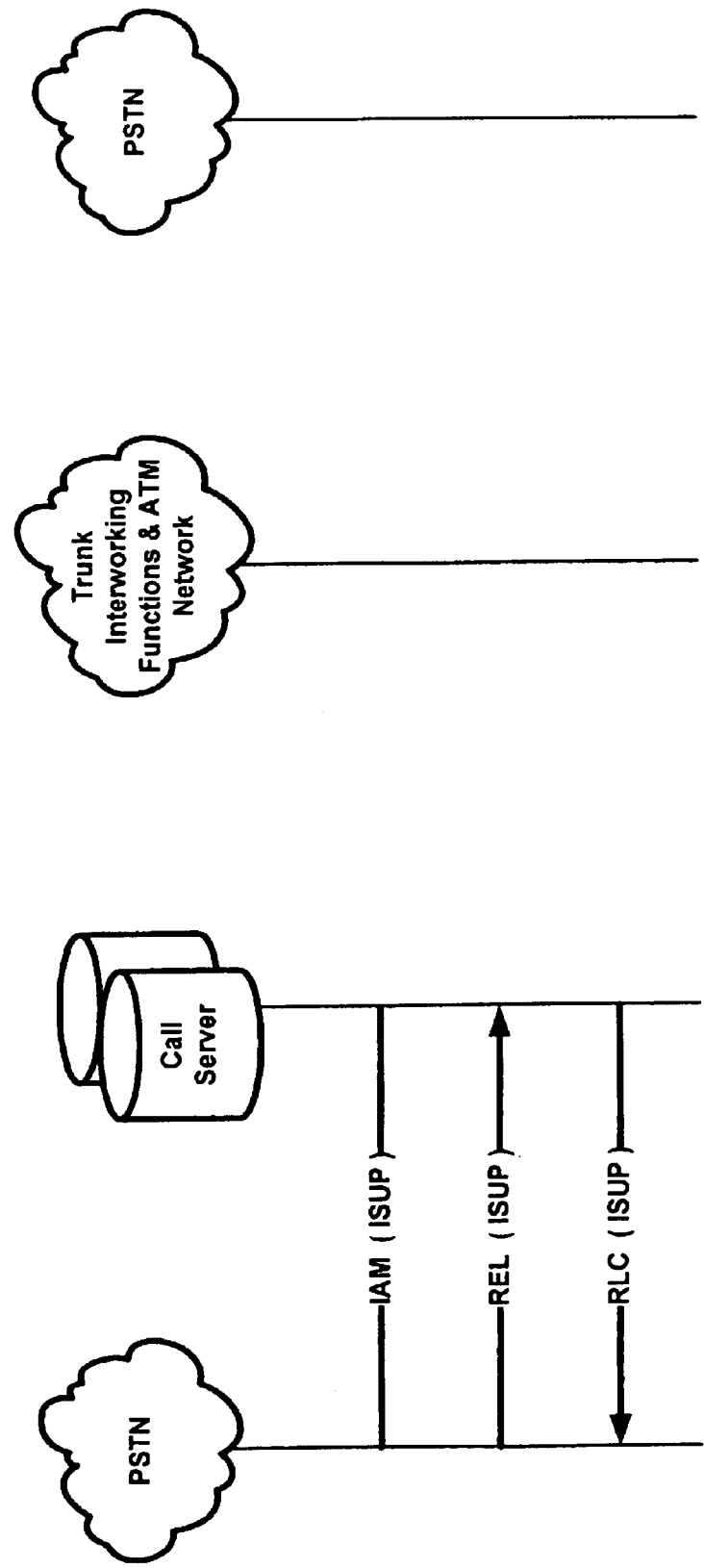
FIG. 5 is an example message sequence chart in which the credit bucket mechanism of FIG. 4 is implemented by the Call Server.

When the Call Server blocks a call during call regulation, it sends back a REL with the cause indicator for called party busy. This considerably reduces the load on the packet network, the destination office and the Call Server itself. FIG. 5 is a sequence chart for a blocked call wherein Call Regulation is implemented by the Call Server. IAMs for calls attempts which are blocked by Call Regulation are not analyzed by any of the mass calling detection mechanisms described above.

It should be noted that this approach forces local handling of service tones—the destination office is never notified of the call attempt and does not present the busy tone to the originator.

It is possible for there to be more than one bucket associated with a given dialed number since a dialed number may be translated into multiple DNs. In this case, the Call Server will chose one of the credit buckets to use for the dialed number. The algorithm used to make the selection is left as an implementation detail.

Some TDM voice switches support call gapping. In such a case, it is possible for the Call Server to delegate some or all of call regulation responsibilities to the TDM voice switches providing the switches are in the same Administrative Region; the voice switches support call gapping; and the voice switches have a compatible external interface that can be accessed by the Call Server.

In the scenario when the Mass Calling Event is Terminated in a Foreign Region, call restriction may have an undesirable effect. Calls flowing to the destination experiencing the Mass Calling Event may come from a variety of networks outside of the Administrative Region. These networks may not be applying regulation or may be restricting calls less aggressively than the network of the Call Server. To ensure fairness to the subscribers of the Administrative Region, an upper limit must be based on the gapping.

There are several aspects to the selection of $T_{arrival}$:

1. Larger intervals reduce the number of call attempts allowed to proceed to the restricted destination. Since the number of failed call attempts must be less than or equal to the total call attempts, the approximate measured number of failed call attempts will be reduced.

2. It is necessary to prevent overly aggressive regulation (for the reasons presented above)—a mechanism is needed to ensure that the destination undergoing restriction still receives enough calls to keep it well utilized.

3. The capacity (number of voice circuits) at the called party may not be known (particularly if the called party is outside of the Administrative Region).

4. The measurement of REL with called party busy may only be a subset of the total number of REL with busy events associated with a particular called party. (particularly if the called party is outside of the Administrative Region).

The following are the parameters used, to determine $T_{arrival}$:

$T_{initial}$, a configurable initial overall gapping interval;

$T_{min}$, a configurable lower bound on the overall recommended gapping interval;

$BM_{max}$, a configurable upper bound on the overall recommended gapping interval;

$BM_O$, the current approximate measured % of call attempts failed;

$BM_I, \ldots, BM_Q$), the last Q approximate measured % of call attempts failed;

$B_F$, a filtered version of the approximate measured % of call attempts failed;

$B_{RT}$, a configurable regulation target for the approximate measured % of call attempts failed;

$B_L$, a configurable tolerance around $B_{RT}$;

$T_{delta}$, a configurable change value in $T_{arrival}$ that can be done in each step.

Initially when call restriction is invoked, $T_{arrival}$ is set to $T_{initial}$. It is then necessary to adjust this interval depending upon whether the detected % of call attempts failed is significantly above or below the configurable target $B_{RT}$.

On each update cycle, the detection procedure passes the current approximate measured % of failed call attempts $BM_O$ to Call Regulation. To ensure a stable measurement, a filtered version of this value is used based on the last Q measurements, where Q is a configurable value. When regulation is first begun by the Call Detection process for a specific RN, all values $(BM_I, \ldots, BM_Q)$ are initialized to the first measured $BM_O$.

A filtered version of the approximate measured % of call attempts blocked, $B_F$, is calculated using the list of values $(BM_O, BM_I, \ldots, BM_Q)$ by removing the highest and lowest values in the list and then calculating the average of the remaining values. The implementation may chose an alternate filtering mechanism to achieve a similar effect.

If $B_F > B_{RT} + B_L$ then it is necessary to increase $T_{arrival}$ to throttle down the call rate further. As a result, $T_{arrival} \leftarrow \min(T_{arrival} + T_{delta}, T_{max})$ The upper limit is required to prevent overly aggressive regulation behavior.

If $B_F < B_{RT} - B_L$ then it is necessary to reduce $T_{arrival}$ to allow more call attempts against the restricted RN. As a result, $T_{arrival} \leftarrow \max(T_{arrival} - T_{delta}, T_{min})$ Finally, it is necessary to update the stored values of approximate measured call blocking $(BM_I, \ldots, BM_Q)$ so that $BM_Q \leftarrow BM_{Q-1}$, $BM_{Q-1} \leftarrow BM_{Q-2}$, $BM_I \leftarrow BM_O$ The following are issues in determining when the Mass Calling Event has ended and call regulation should cease:

the method needs to avoid a "thrashing" behavior where it leaves regulation prematurely and then subsequently re-enters regulation;

call regulation affects the number of detected failed call attempts—to obtain a reasonable measurement $T_{arrival}$ should be $T_{min}$ when it leaves restriction.

To address these issues Call Regulation maintains a counter E for each RN under regulation. This counter is initially zero. In an update interval if the following conditions are met for a RN, the corresponding counter E is incremented.

$B_F < B_{RT} - B_L$ AND;

$T_{arrival} = T_{min}$.

This corresponds to the situation when the number of detected failed call attempts is less than the target $B_{RT}$ adjusted by the tolerance $B_L$ AND $T_{arrival}$ is fully relaxed. If the conditions are not both met then the counter E is reset to 0.

If the counter E is greater than or equal to a configurable parameter $E_{max}$ then the Call Regulation process stops call regulation for the associated RN. This includes:

shutting down the corresponding bucket policer;

notifying the detector to set the corresponding $R_{REG}$ to false; and releasing the state information associated with this RN in the Call Regulation process.

It may be necessary to disable call regulation for calls originating from a subset of the TDM switches. For example, if the call originator is outside of the administrative region of the Call Server and no agreement exists with the foreign network concerning the handling of a REL with cause code indicating called party line busy then the call cannot be regulated in the fashion described above. Instead, the call must be allowed to proceed so that the destination voice switch can present a service tone (busy tone).

To support this feature, the Call Server will maintain a list of Point Codes associated with voice switches for which originating calls should not be regulated. This list of Point Codes, referred to as Disabled, is manually configured on the Call Server. When an IAM is received and the IAM has an OPC equal to a member of Disabled, no regulation is applied to the call. However, the Mass Calling Detection mechanism will not treat the call differently—it will still collect statistics.

While specific embodiments of the invention have been described and illustrated it will be apparent to one skilled in the art that numerous alternatives and variations can be implemented without departing from the scope of the invention as defined by the appended claims.

What is claimed is:

1. A system for controlling telephone calls through the public switched telephone network (PSTN) wherein a packet transport network is employed to transport telephone calls between end systems within the PSTN, the system comprising: a plurality of interworking elements to provide interworking functionality between TDM switches in the PSTN and said packet transport network; and a centralized call server to independently provide tracking and recording functionality respecting telephone calls through said system; said call server including means to detect a mass calling event and to regulate calls to a dialed number for which a mass calling has been detected; and said call server including means to detect the end of a mass event and to end regulation of calls to a dialed number upon detection of an end to a mass calling events, further having a credit bucket mechanism for use in controlling to a dialed number in which a mass calling event has been detected, said credit mechanism including a timer to set an interval for issuing credit tokens to said bucket and a detector to determine if any credits are in the bucket upon receipt of a new call attempt to said dialed number.

2. The system as defined in claim 1 wherein said packet transport network is based on an Asynchronous Transfer Mode (ATM) packet protocol.

3. The system as defined in claim 1 wherein said packet transport network is based on a Frame Relay protocol.

4. The system as defined in claim 1 wherein said packet transport network is based on IP packet protocol.

5. The system as defined in claim 1 wherein a mass calling event is detected by a credit mechanism which monitors the ratio of failed call events to calls initiated to a call destination.

6. The system as defined in claim 1 having means to convert directory numbers to un-translated dialed numbers and to convert un-translated dialed numbers to directory numbers.

7. The system as defined in claim 1 having memory means for storing a directory number of a call terminator.

8. The system as defined in claim 1 wherein said bucket is associated with multiple dialed numbers.

9. The system as defined in claim 1 wherein a credit overflow threshold is provided whereby no new credit tokens are assigned to said bucket when said threshold has been reached.

10. The system as defined in claim 1 wherein credit tokens are assigned to said bucket in accordance with configurable end system determined parameters.

11. The system as defined in claim 10 wherein said configurable end system determined parameters include the time interval between assigning credit tokens to a bucket.

12. The system as defined in claim 1 for use in a Voice over Packet (VoP) network.

13. The system as defined in claim 1 including means to block a call to said dialed number if there are no tokens in the associated bucket and to permit the call to continue if there is at least one token.

14. The system as defined in claim 13 including an overflow threshold unit to limit the number of tokens in said bucket to a configurable value.

15. A method of controlling telephone calls through the public switch telephone network wherein a packet transport network is employed to transport telephone calls between end systems within the PSTN the method comprising: providing a plurality of internetworking elements to provide inter-working functionality between TDM switches in the PSTN and said packet transport and providing a centralized call server to independently provide tracking and recording functionality through the PSTN the call server including means to detect a mass calling event and to regulate calls to a dialed number for which a mass calling event has been detected, and said call server including means to detect the end of a mass calling event and to end regulation of calls to a dialed number upon detection of an end to a mass calling events, further having a credit bucket mechanism for use in controlling calls to a dialed number in which a mass calling event has been detected, said credit mechanism including a timer to set an interval for issuing credit tokens to said bucket and a detector to determine if any credits are in the bucket upon receipt of a new call attempt to said dialed number.

* * * * *